US012556431B1

(12) United States Patent
Kalke et al.

(10) Patent No.: US 12,556,431 B1
(45) Date of Patent: Feb. 17, 2026

(54) ON-DEMAND PRIVATE NETWORK CREATION AND MANAGEMENT

(71) Applicant: AT&T Intellectual Property I, L.P., Atlanta, GA (US)

(72) Inventors: Catherine Kalke, Rancho Mirage, CA (US); Yupeng Jia, South Pasadena, CA (US)

(73) Assignee: AT&T Intellectual Property I, I.P., Atlanta, GA (US)

( * ) Notice: Subject to any disclaimer, the term of this patent is extended or adjusted under 35 U.S.C. 154(b) by 8 days.

(21) Appl. No.: 18/805,624

(22) Filed: Aug. 15, 2024

(51) Int. Cl.
*G06F 21/10* (2013.01)
*G06F 21/44* (2013.01)
*H04L 12/46* (2006.01)

(52) U.S. Cl.
CPC .......... *H04L 12/4641* (2013.01); *G06F 21/44* (2013.01)

(58) Field of Classification Search
CPC .................. H04L 12/4641; G06F 21/1013
See application file for complete search history.

(56) References Cited

U.S. PATENT DOCUMENTS

| 2002/0051540 | A1* | 5/2002 | Glick | H04L 67/52 713/168 |
| 2003/0120940 | A1* | 6/2003 | Vataja | H04L 67/52 380/258 |
| 2005/0165834 | A1* | 7/2005 | Nadeau | H04L 41/28 |
| 2007/0294645 | A1* | 12/2007 | Medvinsky | G06F 21/1013 715/862 |
| 2017/0353435 | A1* | 12/2017 | Pritikin | H04W 4/02 |
| 2023/0254287 | A1* | 8/2023 | Belleau | H04L 63/029 726/15 |
| 2024/0330414 | A1* | 10/2024 | Peev | G06F 21/629 |

* cited by examiner

*Primary Examiner* — Ponnoreay Pich
(74) *Attorney, Agent, or Firm* — Hartman & Citrin LLC

(57) ABSTRACT

On-demand private network creation and management can include detecting that the managed device has entered into a defined private network area that defines an area in which the managed device should be connected to a private network. The private network can be defined by an anchor point and boundaries around the anchor point, the boundaries defining the defined private network area. Using a bootstrap account stored in a non-volatile memory of the managed device and a managed device profile associated with the managed device, the managed device can be authenticated. The managed device profile can define networks with which the managed device can communicate. Using a private network profile, a private network can be created. The private network profile can include data defining the anchor point and the boundaries around the anchor point. The managed device can be added to the private network to communicate with the private network.

20 Claims, 9 Drawing Sheets

ON-DEMAND PRIVATE NETWORK CREATION AND MANAGEMENT

BACKGROUND

A traditional virtual private network can be created in some instances using a networking device located at a particular location and enabling devices to connect to the private network once authenticated. In some instances, this authentication is set up using a token for the private network, with the devices connecting to the private network using the token. Generally, a network connection must be configured and the token obtained and/or installed to enable this connection. Such an approach to authentication and provisioning of private networking services can be time-consuming and inefficient.

SUMMARY

The present disclosure is directed to on-demand private network creation and management. A managed device such as a smartphone, Internet-of-things device, or the like can be pre-loaded with a bootstrap account for authenticating with and/or using a private network. The bootstrap account can include credentials in various embodiments, with the bootstrap account being stored to a secure memory and/or non-volatile memory of the managed device. The managed device can be pre-authenticated in some embodiments by the device management service. One or more profiles including a managed device profile and a private network profile can be created at the device management service via interactions with the device management service by a user device or other device.

The managed device profiles can include information identifying private networks that can be connected to by the managed device as well as information associated with the managed device such as permissions, credentials, settings, configurations, or the like, as will be explained in more detail herein. The managed device profiles can therefore identify the managed device and the private networks using various types of unique identifiers. The private network profiles can include unique identifiers associated with devices, such as the managed device, that can specify what devices are allowed to connect to the private network associated with the private network profile. The private network profile can further include other information associated with the private network such as identifiers for the anchor point, geographic locations associated with the anchor point (if any), definitions of boundaries of the defined private network area, permissions, credentials, settings, configurations, or the like.

The profiles can be used, among other purposes, to determine when a device such as a managed device has entered into the defined private network area (and therefore should be connected to the private network associated with that defined private network area). The managed device (e.g., via execution of the device management client) can be configured to capture and/or collect location information that can define a geographic location of the managed device, network information (e.g., information identifying a network to which the managed device is connected, one or more networks in communication range of the managed device, or the like) that can indicate one or more networks in communication with and/or available for communications to the managed device, and trajectory information that can define a current speed, bearing, acceleration, and/or other motion and/or trajectory information for the managed device. The managed device (via execution of the device management client) can create device updates that include at least one of these types of data and provide the device updates to the device management service.

The device management service can analyze the device updates and determine, based on the device updates, a location and trajectory of the managed device as well as network information associated with the managed device. In some embodiments of the concepts and technologies disclosed herein, the device management service also can analyze network data, which can indicate for mobile anchor points and/or private networks, a current geographic location of the defined private network area. The device management service also can be configured to analyze the profiles (e.g., the private network profiles) to determine location of stationary anchor points and/or private networks. Based on the device updates and the determined locations of the private networks, the device management service can determine if the managed device is in a defined private network area of a private network.

If the managed device has entered a defined private network area of a private network, the managed device can be added to the private network by the local controller, by the device management service, and/or by the managed device itself. Upon connection to the private network, the device management service and/or the local controller can monitor the managed device. If the managed device leaves or is about to leave the defined private network area, the managed device can be removed from the private network. Once all devices on the private network have left the defined private network area, or once a particular device such as the managed device has left the private network, the private network can be torn down and/or terminated. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include detecting, based on a geographic location of a managed device, that the managed device has entered into a defined private network area. The defined private network area can define an area in which the managed device should be connected to a private network. The private network can be defined by an anchor point and boundaries around the anchor point, the boundaries defining the defined private network area. The operations further can include authenticating, using a bootstrap account stored by the managed device and a managed device profile associated with the managed device, the managed device. The bootstrap account can include credentials for the managed device. The bootstrap account can be stored in a non-volatile memory device of the managed device, and the managed device profile can define networks with which the managed device can communicate. The operations further can include creating, using a private network profile, the private network. The private network profile can include data defining the anchor point and the boundaries around the anchor point. The operations also can include adding the managed device to the private network, whereby the managed device communicates with the private network.

In some embodiments, the bootstrap account can be stored in a secure memory, and the credentials of the bootstrap account can be used to pre-authorize the managed device for communications via the private network. In some embodiments, the anchor point of the private network can include a mobile entity, and the boundaries around the anchor point can be defined as distances from the anchor point. In some embodiments, detecting that the managed device has entered into the defined private network area can include determining the geographic location of the managed device, determining a current geographic location of the anchor point, determining current geographic locations of the boundaries, and determining that the managed device is in the defined private network area.

In some embodiments, the anchor point can include a vehicle. In some embodiments, the anchor point of the private network can include a stationary location, and the boundaries around the anchor point can be defined by geographic locations. In some embodiments, the operations further can include monitoring the private network by receiving, from a local controller that controls the private network, network updates including data that indicates a current location of the managed device; and in response to determining that the managed device has left the defined private network area, tearing down the private network.

According to another aspect of the concepts and technologies disclosed herein, a method is disclosed. The method can include detecting, by a computer comprising a processor and based on a geographic location of a managed device, that the managed device has entered into a defined private network area. The defined private network area can define an area in which the managed device should be connected to a private network. The private network can be defined by an anchor point and boundaries around the anchor point, the boundaries defining the defined private network area. The method further can include authenticating, by the processor and using a bootstrap account stored by the managed device and a managed device profile associated with the managed device, the managed device. The bootstrap account can include credentials for the managed device. The bootstrap account can be stored in a non-volatile memory device of the managed device, and the managed device profile can define networks with which the managed device can communicate. The method further can include creating, by the processor and using a private network profile, the private network. The private network profile can include data defining the anchor point and the boundaries around the anchor point. The method also can include adding, by the processor, the managed device to the private network, whereby the managed device communicates with the private network.

In some embodiments, the bootstrap account can be stored in a secure memory, and the credentials of the bootstrap account can be used to pre-authorize the managed device for communications via the private network. In some embodiments, the anchor point of the private network can include a mobile entity, and the boundaries around the anchor point can be defined as distances from the anchor point. In some embodiments, detecting that the managed device has entered into the defined private network area can include determining the geographic location of the managed device, determining a current geographic location of the anchor point, determining current geographic locations of the boundaries, and determining that the managed device is in the defined private network area.

In some embodiments, the anchor point can include a vehicle. In some embodiments, the anchor point of the private network can include a stationary location, and the boundaries around the anchor point can be defined by geographic locations. In some embodiments, the method further can include monitoring the private network by receiving, from a local controller that controls the private network, network updates including data that indicates a current location of the managed device; and in response to determining that the managed device has left the defined private network area, tearing down the private network.

According to yet another aspect of the concepts and technologies disclosed herein, a computer storage medium is disclosed. The computer storage medium can store computer-executable instructions that, when executed by a processor, cause the processor to perform operations. The operations can include detecting, based on a geographic location of a managed device, that the managed device has entered into a defined private network area. The defined private network area can define an area in which the managed device should be connected to a private network. The private network can be defined by an anchor point and boundaries around the anchor point, the boundaries defining the defined private network area. The operations further can include authenticating, using a bootstrap account stored by the managed device and a managed device profile associated with the managed device, the managed device. The bootstrap account can include credentials for the managed device. The bootstrap account can be stored in a non-volatile memory device of the managed device, and the managed device profile can define networks with which the managed device can communicate. The operations further can include creating, using a private network profile, the private network. The private network profile can include data defining the anchor point and the boundaries around the anchor point. The operations also can include adding the managed device to the private network, whereby the managed device communicates with the private network.

In some embodiments, the bootstrap account can be stored in a secure memory, and the credentials of the bootstrap account can be used to pre-authorize the managed device for communications via the private network. In some embodiments, the anchor point of the private network can include a mobile entity, and the boundaries around the anchor point can be defined as distances from the anchor point. In some embodiments, detecting that the managed device has entered into the defined private network area can include determining the geographic location of the managed device, determining a current geographic location of the anchor point, determining current geographic locations of the boundaries, and determining that the managed device is in the defined private network area.

In some embodiments, the anchor point can include a vehicle. In some embodiments, the anchor point of the private network can include a stationary location, and the boundaries around the anchor point can be defined by geographic locations. In some embodiments, the operations further can include monitoring the private network by receiving, from a local controller that controls the private network, network updates including data that indicates a current location of the managed device; and in response to determining that the managed device has left the defined private network area, tearing down the private network.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
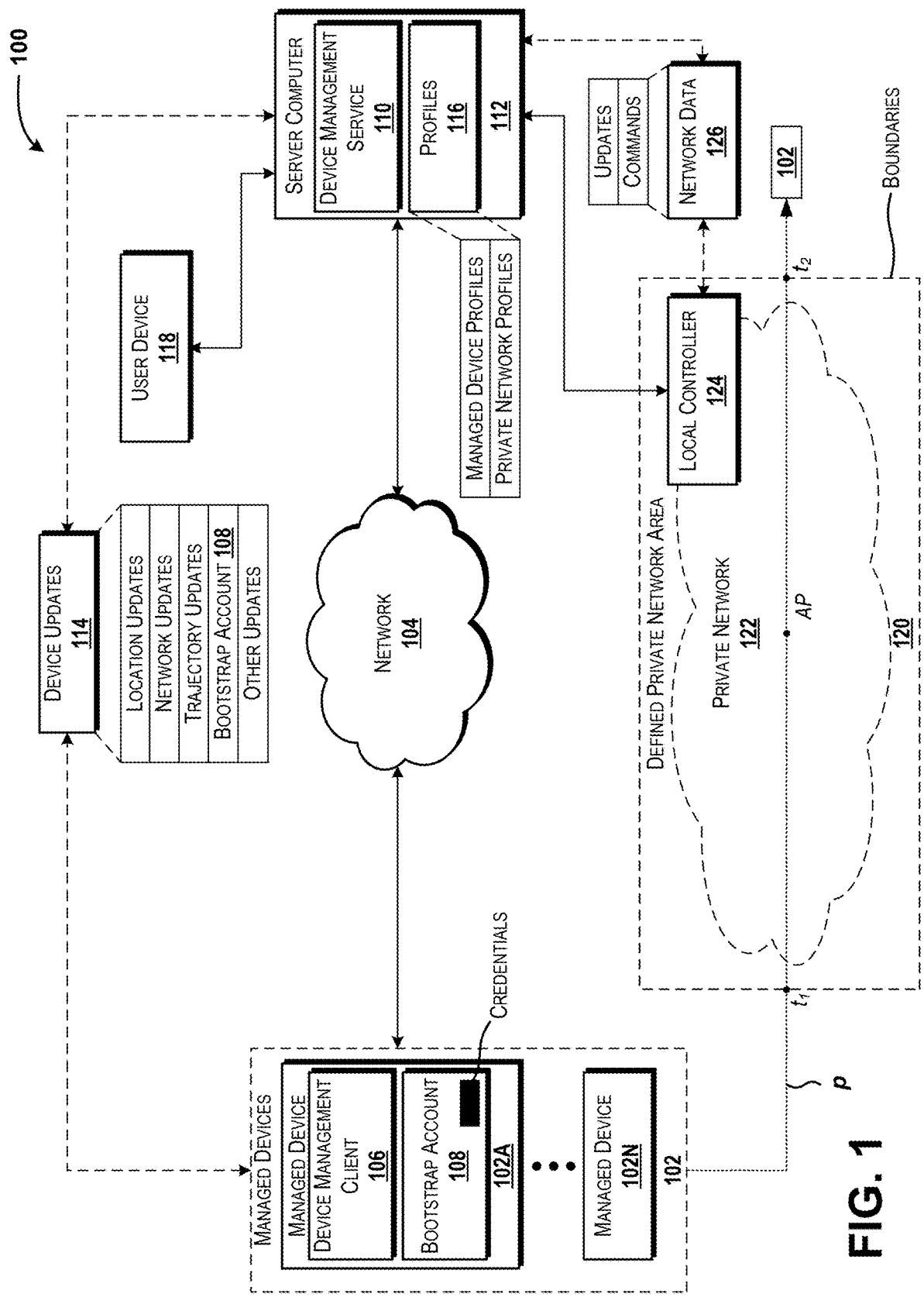
FIG. 1 is a system diagram illustrating an illustrative operating environment for various embodiments of the concepts and technologies described herein.

The following detailed description is directed to on-demand private network creation and management. A managed device such as a smartphone, Internet-of-things device, or the like can be pre-loaded with a bootstrap account for authenticating with and/or using a private network. The bootstrap account can include credentials in various embodiments, with the bootstrap account being stored to a secure memory and/or non-volatile memory of the managed device. The managed device can be pre-authenticated in some embodiments by the device management service. One or more profiles including a managed device profile and a private network profile can be created at the device management service via interactions with the device management service by a user device or other device.

The managed device profiles can include information identifying private networks that can be connected to by the managed device as well as information associated with the managed device such as permissions, credentials, settings, configurations, or the like, as will be explained in more detail herein. The managed device profiles can therefore identify the managed device and the private networks using various types of unique identifiers. The private network profiles can include unique identifiers associated with devices such as the managed device that can specify what devices are allowed to connect to the private network associated with the private network profile. The private network profile can further include other information associated with the private network such as identifiers for the anchor point, geographic locations associated with the anchor point (if any), definitions of boundaries of the defined private network area, permissions, credentials, settings, configurations, or the like.

The profiles can be used, among other purposes, to determine when a device such as a managed device has entered into the defined private network area (and therefore should be connected to the private network associated with that defined private network area). The managed device (e.g., via execution of the device management client) can be configured to capture and/or collect location information that can define a geographic location of the managed device, network information (e.g., information identifying a network to which the managed device is connected, one or more networks in communication range of the managed device, or the like) that can indicate one or more networks in communication with and/or available for communications to the managed device, and trajectory information that can define a current speed, bearing, acceleration, and/or other motion and/or trajectory information for the managed device. The managed device (via execution of the device management client) can create device updates that includes at least one of these types of data and provide the device updates to the device management service.

The device management service can analyze the device updates and determine, based on the device updates, a location and trajectory of the managed device as well as network information associated with the managed device. In some embodiments of the concepts and technologies disclosed herein, the device management service also can analyze network data, which can indicate for mobile anchor points and/or private networks, a current geographic location of the defined private network area. The device management service also can be configured to analyze the profiles (e.g., the private network profiles) to determine location of stationary anchor points and/or private networks. Based on the device updates and the determined locations of the private networks, the device management service can determine if the managed device is in a defined private network area of a private network.

If the managed device has entered a defined private network area of a private network, the managed device can be added to the private network by the local controller, by the device management service, and/or by the managed device itself. Upon connection to the private network, the device management service and/or the local controller can monitor the managed device. If the managed device leaves or is about to leave the defined private network area, the managed device can be removed from the private network. Once all devices on the private network have left the defined private network area (or once a particular device such as the managed device has left the private network, the private network can be torn down and/or terminated. It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for on-demand private network creation and management will be described, according to an illustrative embodiment. The operating environment 100 shown in FIG. 1 includes one or more managed devices 102A-N (hereinafter collectively and/or generically referred to as "managed devices 102"). The managed devices 102 can operate in communication with and/or as part of a communications network ("network") 104, though this is not necessarily the case in all embodiments.

According to various embodiments, the functionality of one or more of the managed devices 102 may be provided by mobile telephones, laptop computers, smartphones, tablet computers, air-based vehicles such as unmanned aerial vehicles ("UAVs") or drones, land-based vehicles such as connected cars or trucks, Internet-of-things devices, other computing systems, and the like. It should be understood that the functionality of the managed devices 102 may be provided by a single device, by two or more similar devices, and/or by two or more dissimilar devices. For purposes of describing the concepts and technologies disclosed herein, the managed devices 102 are described herein as a smartphones. It should be understood that this embodiment is illustrative, and should not be construed as being limiting in any way.

For purposes of illustrating the concepts and technologies disclosed herein, the managed device 102A is illustrated in FIG. 1 as including various components that will be described in more detail. It should be understood that one or more and/or each of the managed devices 102 can include the functionality illustrated and described herein, and that the components of the example managed device 102A are illustrated and described in more detail as an example embodiment of some or all of the managed devices 102. As such, the description herein will refer to a generic "managed device 102," with the understanding that each illustrated managed device 102 can include the components illustrated in FIG. 1 only with respect to the managed device 102A. As such, it should be understood that this example embodiment is illustrative, and therefore should not be construed as being limiting in any way.

As shown in FIG. 1, the managed device 102 can be configured to execute an operating system (not labeled in FIG. 1) and one or more application programs such as, for example, a device management client 106. The operating system can include a computer program that can control the operation of the managed device 102. The device management client 106 can include an executable program that can be configured to execute on top of the operating system to provide various functions as illustrated and described herein for obtaining on-demand private network creation and management. The functionality of the device management client 106 will be illustrated and described in more detail after introducing additional entities included in the operating environment 100.

As will be explained in more detail herein, the managed device 102 can include a non-volatile memory (not labeled in FIG. 1) for storing various types of data, program modules, and/or other software. In various contemplated embodiments, a bootstrap account 108 can be stored in the non-volatile memory of the managed device 102. The bootstrap account 108 can correspond to a pre-provisioned suite of services and/or other data that can be used by the device management client 106. The device management client 106 can use the bootstrap account 108 to prepare the managed device 102 on which the bootstrap account 108 is loaded and/or stored for connection to one or more private network devices and/or entities, as will be illustrated and described in more detail herein.

According to various embodiments of the concepts and technologies disclosed herein, the bootstrap account 108 can include credentials (e.g., unique keys and/or identifiers, shared keys, or the like) for the managed device 102 to use when connecting to a computing environment and/or network. According to various embodiments of the concepts and technologies disclosed herein, the bootstrap account 108 can be stored at the managed device 102. In some embodiments of the concepts and technologies disclosed herein, the bootstrap account 108 (and credentials in some embodiments) can be stored at the managed device 102 during manufacturing, when firmware and/or software is loaded to the managed device 102, and/or the like. In various embodiments of the concepts and technologies disclosed herein, the bootstrap account 108 and credentials can be unique to the managed device 102. Additional details relating to the bootstrap account 108 will be illustrated and described below after introducing additional entities of the operating environment 100. Thus, the above example features should be understood as being illustrative, and therefore should not be construed as being limiting in any way.

The operating environment 100 also can include a device management service 110. The device management service 110 can be hosted and/or executed by a computing device such as a server computer 112. The device management service 110 can be configured to coordinate private networking resource creation, modification, termination, and/or management as illustrated and described herein; to create, modify, delete, and/or use managed device profiles and/or private network profiles as illustrated and described herein; and/or to communicate with and/or manage private networking resources such as controllers and the like, as will be illustrated and described herein. These and other functions of the device management service 110 will be described in additional detail after introducing other devices and/or entities in the operating environment 100.

As can be seen in FIG. 1, the device management service 110 can receive, from the one or more managed device 102, device updates 114. The device updates 114 can include releases of data and/or updates relating to the managed device 102 such as, for example, location updates for the managed device 102, network updates for the managed device 102, trajectory updates for the managed device 102 (e.g., data points describing speed, bearing, acceleration, and the like of the managed device 102 and/or changes to the speed, bearing, acceleration, or the like of the managed device 102), and/or other updates as will be illustrated and described herein.

The device updates 114 can be collected and created by the managed device 102 (e.g., via executing the device management client 106) and provided by the managed device 102 to the server computer 112 via periodic releases, a data stream, or the like. In some embodiments, the device updates 114 can be sent by the managed devices 102 to the server computer 112 when an update exists (e.g., when a location of one of the managed devices 102 changes, when a network and/or network connection of one of the managed devices 102 changes, when a trajectory of one of the managed devices 102 changes, or the like), at regular or irregular time intervals, according to a release schedule, combinations thereof, or the like. Additional aspects of the device updates 114 will be illustrated and described herein after introducing additional entities and/or devices of the operating environment 100.

As shown in FIG. 1, the device management service 110 can receive the device updates 114. The device management service 110 can be configured to analyze the device updates 114 and determine, based on the device updates 114, locations of the managed devices 102, networks to which the managed devices 102 are connected and/or with which the managed devices 102 are communicating, trajectories (e.g., bearings, speeds, accelerations, and the like) of the managed devices 102, and the like. As will be explained in more detail below, the device management service 110 can be configured to generate profiles 116 using the device updates 114 and/or other data as will be explained in more detail herein. In some embodiments, the profiles 116 can include managed device profiles that can describe private networking capabilities, permissions, and/or configurations or settings for the managed device 102 and/or private network profiles that can describe private networking resources and permissions and/or settings associated therewith. It should be understood that this example embodiment is illustrative, and therefore should not be construed as being limiting in any way.

Additionally, the device management service 110 can be configured to communicate with other devices or entities (e.g., a user device 118 of an authorized user or the like) as will be discussed in additional detail below. According to various embodiments of the concepts and technologies disclosed herein, the user device 118 can interact directly with the device management service 110 (e.g., via an application programming interface ("API"), portal, website, or the like) to configure the device management service 110, to create the profiles 116, and/or for tother reasons as will be illustrated and described in more detail below. Thus, it can be appreciated that the user device 118 can communicate with the device management service 110 to configure various functions of the device management service 110 and/or various types of data created and/or stored by the server computer 112. It should be understood that this example embodiment is illustrative, and therefore should not be construed as being limiting in any way.

According to various embodiments of the concepts and technologies disclosed herein, a defined private network area 120 can define boundaries and/or locations associated with a corresponding private network 122. The boundaries and/or locations can be defined in absolute or relative terms. In other words, an anchor point for a private network 122 can be defined, with the anchor point corresponding to a location or a device. The boundaries can be defined as geographic locations or boundaries (e.g., in absolute terms such as in latitude and longitude, geographic location coordinates, or the like) and/or in relative terms (e.g., a distance from the anchor point in some, all, or various directions, or the like). It should also be understood that, according to various embodiments of the concepts and technologies disclosed herein, the boundaries of the defined private network area 120 can be defined in three dimensions (e.g., the boundaries can be defined, for example, by a regular or irregular sphere or ellipsoid around the anchor point and/or by other three dimensional boundaries). As such, it can be appreciated that the airspace above an anchor point can be included in the defined private network area 120.

Thus, for example, boundaries of a defined private network area 120 can include some (but not all) floors of a building, for example, air space above a geographic location corresponding to the anchor point, space below the anchor point, combinations thereof, or the like. It should be understood that this example embodiment is illustrative, and therefore should not be construed as being limiting in any way. Thus, it can be appreciated that the absolute geographic location of the private network 122 can be stationary in some embodiments (e.g., where the anchor point is a tower, building, stationary equipment, or the like) and mobile in some other embodiments (e.g., where the anchor point corresponds to a vehicle or other mobile entity). It should be understood that this example embodiment is illustrative, and therefore should not be construed as being limiting in any way.

While FIG. 1 shows only one defined private network area 120 as an illustrative example, any number of defined private network areas 120 and associated private networks 122 can exist in embodiments of the concepts and technologies disclosed herein. As mentioned above, the defined private network area 120 can define boundaries inside which a device, such as the managed devices 102, will connect to a private network 122. In some example embodiments, the boundaries of the defined private network area 120 can be defined by geographic locations, features, or descriptors (e.g., coordinates, ZIP codes, cities, buildings, or the like), while in some other embodiments the boundaries of the defined private network area 120 can be defined relative to an anchor point (e.g., any number of fect or meters from the anchor point in one or more directions including in two or three dimensions). It should be understood that the distances to the boundaries from the anchor point are not necessarily the same in all directions and that the boundaries can include air space located above the anchor point and/or other spaces (empty or not) below the anchor point, in various embodiments. It should be understood that this example embodiment is illustrative, and therefore should not be construed as being limiting in any way.

In some embodiments, a local controller 124 can be located at or in proximity to the defined private network area 120. In some embodiments, the local controller 124 can be the anchor point and/or can operate as a module thereon or therein, while in some other embodiments the local controller 124 can be located at any location at or near the defined private network area 120. The local controller 124 can include hardware and/or software for controlling the connection of one or more devices (e.g., the managed devices 102) to the private network 122 and/or for tracking connection and disconnection of the devices (e.g., the managed devices 102) from the private network 122.

According to various embodiments of the concepts and technologies disclosed herein, the local controller 124 can exchange network data 126 with the device management service 110. The network data 126 can include updates, commands, and/or other data that can be generated by the local controller 124 and provided to the server computer 112 and/or generated by the server computer 112 and provided to the local controller 124. In particular, the local controller 124 can provide updates to the device management service 110 such as, for example, devices connecting to the private network 122, devices disconnecting from the private network 122, devices moving into the defined private network area 120, devices moving out of the defined private network area 120, and the like. It should be understood that this example embodiment is illustrative, and therefore should not be construed as being limiting in any way.

Now that the devices and entities shown in FIG. 1 have been disclosed, the functionality of the device management client 106 and the device management service 110 will be described in more detail. As noted above, the managed devices 102 can generate the device updates 114 based on activity at the managed devices 102. The managed devices 102 can provide the device updates 114 to the device management service 110. More details on the creation of the device updates 114 will be provided herein. Similarly, the local controller 124 and/or other devices or entities associated with the private network 122 can generate the network data 126 and provide the network data 126 to the device management service 110. More details of the generation of the network data 126 will be provided herein.

According to various embodiments of the concepts and technologies disclosed herein, the device management service 110 can be configured to receive and/or obtain the device updates 114 from the managed devices 102, the network data 126 from one or more local controllers 124, and/or other data and/or interactions from and/or with the user device 118. The device management service 110 can analyze the device updates 114 and the network data 126 to create the profiles 116 illustrated and described herein.

In particular, a user or other authorized entity can connect to the device management service 110 using a user device 118. Via interactions with the device management service 110, the user device 118 can be used to create one or more private network profiles and/or managed device profiles included in the profiles 116. Because the profiles 116 can be created at additional or alternative times, it should be understood that this example is illustrative.

At any rate, with regard to the managed device profiles, a user or other entity can define, for a particular device such as one or more of the managed devices 102, one or more private networks 122 that the one or more managed devices 102 will be authorized to use. Information identifying those private networks 122 (e.g., unique network identifiers, geographic locations, associated IP addresses, or the like) can be included in a managed device profile to indicate what private networks 122 can be connected to by the managed device 102. The managed device profile can further include other information associated with the managed device 102 such as permissions, credentials, settings, configurations, or the like, as will be explained in more detail herein.

With regard to private network profiles, a unique identifier associated with the managed device 102 (e.g., an international mobile subscriber identity ("IMSI"), an international mobile equipment identity ("IMEI"), a media access control identifier ("MAC ID"), or other identifier) can be added to a private network profile that can specify what devices are allowed to connect to the private network 122 associated with the private network profile. The private network profile can further include other information associated with the private network 122 such as identifiers for the anchor point, geographic locations associated with the anchor point (if any), definitions of boundaries of the defined private network area 120, permissions, credentials, settings, configurations, or the like, as will be explained in more detail herein.

Thus, the private network profiles included in the profiles 116 can include, for example, geographic location identifiers (e.g., coordinates, ZIP codes, addresses, or the like) for defining boundaries associated with the defined private network areas 120 of private networks 122, distances for the boundaries (relative to the anchor point), or the like. This information can be used, among other purposes, to determine when a device such as a managed device 102 has entered into the defined private network area 120 (and therefore should be connected to the private network 122 associated with that defined private network area 120). Thus, it can be appreciated that the profiles 116 can include, among other information, information identifying which devices can connect to which private networks 122 and definitions of the anchor point and boundaries of the defined private network area 120. It should be understood that this example embodiment is illustrative, and therefore should not be construed as being limiting in any way.

According to various embodiments of the concepts and technologies disclosed herein, the device management service 110 can obtain and/or receive the device updates 114 at substantially any time, as noted above. The device updates 114 can be generated, according to various embodiments of the concepts and technologies disclosed herein, by the device management client 106 executed by the managed devices 102. The device management client 106 can be configured to collect location information (e.g., a current geographic location of the managed device 102 as determined by a global positioning system ("GPS") receiver of the managed device 102, via interactions with a location beacon, via interactions with a WiFi device (e.g., a router or hotspot, or the like), via location updates received from a cellular network or other types of networks such as the network 104, or the like). The current location can be represented in the device updates 114 as a location update. Thus, the device management service 110 can analyze the device updates 114 to determine a current location of the managed device 102 that generated the device update 114, transmitted the device update 114, and/or otherwise is associated with the device update 114. It should be understood that this example embodiment is illustrative, and therefore should not be construed as being limiting in any way.

The device management client 106 also can be configured to collect network information (e.g., information identifying a network to which the managed device 102 is connected, one or more networks in communication range of the managed device 102, or the like). The networks can be represented in the device updates 114 as one or more network updates. Thus, the device management service 110 can analyze the device updates 114 to determine one or more networks in communication with and/or available for communications to the managed device 102 that generated the device update 114, transmitted the device update 114, and/or otherwise is associated with the device update 114. It should be understood that this example embodiment is illustrative, and therefore should not be construed as being limiting in any way.

The device management client 106 also can be configured to collect trajectory information. As noted above, the trajectory information can reflect, inter alia, a current speed of the managed device 102, a current bearing or direction of travel associated with the managed device 102, a current acceleration of the managed device 102, and/or other motion and/or trajectory information for the managed device 102. It can be appreciated that the speed, bearing and/or direction of travel, and/or the acceleration of the managed device 102 can be determined by the device management client 106, for example, by comparing two or more coordinates calculated using a GPS receiver of the managed device 102 at two or more times. In any event, the trajectory information can be represented in the device updates 114 as one or more trajectory updates. Thus, the device management service 110 can analyze the device updates 114 to determine a current trajectory of the managed device 102 that generated the device update 114, transmitted the device update 114, and/or otherwise is associated with the device update 114. This trajectory information may be used to project when the managed device 102 will enter into the defined private network area 120 associated with a private network 122. It should be understood that this example embodiment is illustrative, and therefore should not be construed as being limiting in any way.

During a setup phase for the device management service 110 and/or at other times, a user or other entity can interact with the device management service 110 to create one or more profiles 116 (including managed device profiles and/or private network profiles). The managed device profiles can define, for a uniquely identified device such as the managed device 102, identifying information, authentication information, permissions, provisioning information, and one or more private networks 122 with which the managed device 102 should connect when within the defined private network area 120 associated with the private network 122. The private network profiles can define, for a uniquely identified network such as the private network 122, coordinates and/or boundaries that define the associated defined private network area 120; one or more devices, e.g., one or more of the managed devices 102, that are authorized to connect to the private network 122; and the like. It should be understood that these example embodiments are illustrative, and therefore should not be construed as being limiting in any way.

The device management service 110 can be configured to create and store the profiles 116. According to various embodiments of the concepts and technologies disclosed herein, the device management service 110 can be configured to store the profiles 116 at a data storage device associated with the server computer 112 (e.g., a memory, a data storage resource, or the like). According to some other embodiments, the device management service 110 can be configured to store the profiles 116 at an external data storage device or resource such as a data store, a database, a data server, or the like (not shown in FIG. 1). Thus, it should be understood that the illustrated embodiment is illustrative, and therefore should not be construed as being limiting in any way.

When a managed device 102 is determined by the device management service 110 and/or other entities to have moved into the defined private network area 120, the device management service 110 can be configured to authenticate the managed device 102. In some other embodiments, the pre-authentication of the managed device 102 may obviate the authentication at this point. Regardless, the device management service 110 can instruct (or trigger other devices to instruct) the local controller 124 to add the managed device 102 to the private network 122. As explained above, the managed device 102 can authenticate with the device management service 110 and/or the local controller 124 using the bootstrap account 108 and/or credentials associated therewith. Thus, the pre-authenticated and/or pre-provisioned managed device 102 (e.g., pre-authenticated and/or pre-provisioned by way of the bootstrap account 108 in some embodiments) can be joined to the private network 122 soon after entering the defined private network area 120 (or after it is determined that the managed device 102 has entered the defined private network area 120). It should be understood that this example embodiment is illustrative, and therefore should not be construed as being limiting in any way.

After connecting to the private network 122, the local controller 124 and/or the device management service 110 can monitor the activity of the managed device 102 and/or the movements of the managed device 102 within or relative to the defined private network area 120 and/or the like. Thus, for example, if the managed device leaves the defined private network area 120, the local controller 124 and/or the device management service 110 can be aware of this and remove the managed device 102 from the private network 122. In some embodiments, the local controller 124 and/or the device management service 110 can determine if all devices on the private network 122 (or a specific device such as the managed device 102 on the private network 122) have or has left the private network 122. Once a specific device such as the managed device 102 has left the private network 122 and/or after all devices have left the private network 122, the local controller 124 and/or the device management service 110 can tear down (i.e., terminate) the private network 122. It should be understood that this example embodiment is illustrative, and therefore should not be construed as being limiting in any way.

In practice, a managed device 102 can be pre-loaded with a bootstrap account 108 for authenticating with and/or using a private network 122. The managed device 102 can be pre-authenticated in some embodiments by the device management service 110. One or more profiles 116 including a managed device profile and a private network profile can be created at the device management service 110 via interactions with the device management service 110 by a user device 118 or other device. The managed device profiles can include information identifying private networks 122 that can be connected to by the managed device 102 as well as information associated with the managed device 102 such as permissions, credentials, settings, configurations, or the like, as will be explained in more detail herein.

The managed device profiles can therefore identify the managed device 102 and the private networks 122 using various types of unique identifiers. The private network profiles can include unique identifiers associated with devices such as the managed device 102 that can specify what devices are allowed to connect to the private network 122 associated with the private network profile. The private network profile can further include other information associated with the private network 122 such as identifiers for the anchor point, geographic locations associated with the anchor point (if any), definitions of boundaries of the defined private network area 120, permissions, credentials, settings, configurations, or the like.

The profiles can be used, among other purposes, to determine when a device such as a managed device 102 has entered into the defined private network area 120 (and therefore should be connected to the private network 122 associated with that defined private network area 120). The managed device 102 (e.g., via execution of the device management client 106) can be configured to capture and/or collect location information that can define a geographic location of the managed device 102, network information (e.g., information identifying a network to which the managed device 102 is connected, one or more networks in communication range of the managed device 102, or the like) that can indicate one or more networks in communication with and/or available for communications to the managed device 102, and trajectory information that can define a current speed, bearing, acceleration, and/or other motion and/or trajectory information for the managed device 102. The managed device 102 (via execution of the device management client 106) can create device updates 114 that include at least one of these types of data and provide the device updates 114 to the device management service 110.

The device management service 110 can analyze the device updates 114 and determine, based on the device updates 114, a location and trajectory of the managed device 102 as well as network information associated with the managed device 102. In some embodiments of the concepts and technologies disclosed herein, the device management service 110 also can analyze network data 126, which can indicate for mobile anchor points and/or private networks 122, a current geographic location of the defined private network area 120. The device management service 110 also can be configured to analyze the profiles 116 (e.g., the private network profiles) to determine location of stationary anchor points and/or private networks 122. Based on the device updates 114 and the determined locations of the private networks 122, the device management service 110 can determine if the managed device 102 is in a defined private network area 120 of a private network 122.

If the managed device has entered a defined private network area 120 of a private network 122, the managed device 102 can be added to the private network 122 by the local controller 124, by the device management service 110, and/or by the managed device 102 itself. Upon connection to the private network 122, the device management service 110 and/or the local controller 124 can monitor the managed device 102. If the managed device 102 leaves or is about to leave the defined private network area 120, the managed device 102 can be removed from the private network. Once all devices on the private network 122 have left the defined private network area 120 (or once a particular device such as the managed device 102 has left the private network 122), the private network 122 can be torn down and/or terminated. It should be understood that this example embodiment is illustrative, and therefore should not be construed as being limiting in any way.

As such, referring to FIG. 1, an example embodiment of the concepts and technologies disclosed herein can include the managed device 102 moving along a path p. The managed device 102 can enter the defined private network area 120 at a first time $t_1$. The local controller 124 and/or the device management service 110 can determine the managed device 102 has entered into the defined private network area 120 and the managed device 102 can join the private network 122. As the managed device 102 moves along the path p, the managed device 102 can communicate via the private network 122. At a second time $t_2$, the managed device 102 can exit the defined private network area 120. The local controller 124 and/or the device management service 110 can determine that the managed device 102 has exited the defined private network area 120 and the managed device 102 can be removed from the private network 122. In some embodiments, the local controller 124 and/or the device management service 110 can be configured to tear down the private network 122 when the managed device 102 leaves the defined private network area 120 and/or when all connected devices leave the defined private network area 120. It should be understood that this example embodiment is illustrative, and therefore should not be construed as being limiting in any way.

FIG. 1 illustrates two managed devices 102, one network 104, one server computer 112, one user device 118, one defined private network area 120, one private network 122, and one local controller 124. It should be understood, however, that various implementations of the operating environment 100 can include one, two or more than two managed devices 102; one or more than one network 104; zero, one, or more than one server computer 112; one or more than one user device 118; one or more than one defined private network area 120; one or more than one private network 122; and zero, one, or more than one local controller 124. As such, the illustrated embodiment should be understood as being illustrative, and should not be construed as being limiting in any way.

Figure 2:
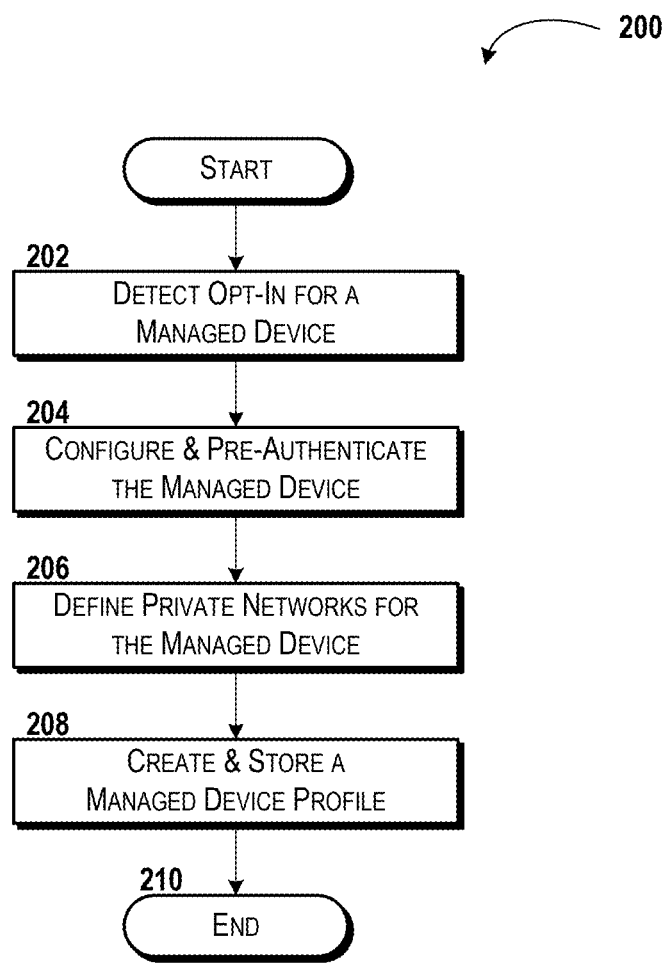
FIG. 2 is a flow diagram showing aspects of a method for creating and storing managed device profiles using a device management service, according to an illustrative embodiment of the concepts and technologies described herein.

Turning now to FIG. 2, aspects of a method 200 for creating and storing managed device profiles using a device management service 110 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 112, to perform one or more operations and/or causing the processor to direct other components of the computing system or device to perform one or more of the operations.

For purposes of illustrating and describing the concepts of the present disclosure, the method 200 is described herein as being performed by the server computer 112 via execution of one or more software modules such as, for example, the device management service 110. It should be understood that additional and/or alternative devices and/or network nodes can provide the functionality described herein via execution of one or more modules, applications, and/or other software including, but not limited to, the device management service 110. Thus, the illustrated embodiments are illustrative, and should not be viewed as being limiting in any way.

The method 200 begins at operation 202. At operation 202, the server computer 112 can detect an opt-in for a managed device 102 and/or other indication that a managed device 102 is requesting or registering to be managed by the device management service 110. In some embodiments of the concepts and technologies disclosed herein, the managed device 102 can be configured (e.g., via instructions included in the device management client 106 and/or the bootstrap account 108) to connect to the device management service 110 to opt-in, register, and/or sign up for management by the device management service 110. In some embodiments, the managed device 102 can be configured to connect to the device management service 110 during a manufacturing and/or configuration process (e.g., when software and/or firmware is loaded to the managed device 102, when the managed device 102 is first connected to a network, and/or the like). Thus, operation 202 can correspond to the managed device 102 accessing the device management service 110 to request and/or be provisioned with management by the device management service 110. It should be understood that this example embodiment is illustrative, and therefore should not be construed as being limiting in any way.

From operation 202, the method 200 can proceed to operation 204. At operation 204, the server computer 112 can configure and pre-authenticate the managed device 102. In some embodiments of the concepts and technologies disclosed herein, operation 204 can correspond to the bootstrap account 108 (and one or more sets of authentication credentials "credentials" for the device) being loaded to the managed device 102 (e.g., during a manufacturing process, during a setup process, or the like). In some embodiments of the concepts and technologies disclosed herein, the bootstrap account 108 can be loaded to a non-volatile memory of the managed device 102 to avoid erasure, or the like. In some embodiments, the bootstrap account 108 and/or the credentials can be stored in a secure member portion of the non-volatile memory of the managed device 102, thereby restricting access to the credentials by any unauthorized entity in possession of the managed device 102. It should be understood that this example embodiment is illustrative, and therefore should not be construed as being limiting in any way.

In some other embodiments, operation 204 can include an authentication operation, which can be performed before configuring and/or pre-authenticating the managed device 102. Thus, operation 204 can include the managed device 102 connecting to the device management service 110 and authenticating with the device management service 110 before obtaining pre-authentication and/or being configured. It should be understood that this example embodiment is illustrative, and therefore should not be construed as being limiting in any way.

From operation 204, the method 200 can proceed to operation 206. At operation 206, the server computer 112 can configure one or more private network connections for the managed device 102. Operation 206 can include the server computer 112 identifying one or more private networks 122 for which the managed device 102 will be authorized and/or configured for communication with and/or via. Operation 206 can correspond to the server computer 112 identifying one or more private networks 122 and configuring various connection parameters associated with the private networks 122 being configured by the server computer 112 (e.g., via execution of the device management service 110).

For example, in operation 206, the server computer 112 can create a list of private networks 122 that the managed device 102 will be configured to communicate with and/or via. Also, operation 206 can include the server computer 112 configuring, for each of the identified private networks 122, connection protocols, authentication requirements, credentials, connection times, connection speeds, permissions, and/or other parameters that will apply to the managed device 102 when the managed device 102 connects to the associated private network 122. Additionally, or alternatively, the server computer 112 can specify how quickly the managed device 102 will connect to the private network 122 when entering into the defined private network area 120 (e.g., a number of seconds or minutes that will pass before the managed device 102 connects to the private network 122 upon entering into the defined private network area 120); how quickly the managed device 102 will disconnect from the private network 122 when exiting from the defined private network area 120 and/or approaching a boundary of the defined private network area 120 (e.g., a number of seconds or minutes that will pass after the managed device 102 leaves the defined private network area 120 before the managed device disconnects from the private network 122); encryption protocols to be used for communications of the managed device 102 via the private network 122; combinations thereof; or the like.

Thus, operation 206 can correspond to the server computer 112 (via execution of the device management service 110) configuring the managed device 102 to connect to one or more private networks 122 and/or the server computer 112 (via execution of the device management service 110) defining details of how the managed device 102 should and/or will connect to the private network 122. Because additional and/or alternative parameters and/or connection instructions can be configured in operation 206, it should be understood that these examples are illustrative, and therefore should not be construed as being limiting in any way.

From operation 206, the method 200 can proceed to operation 208. At operation 208, the server computer 112 can create and store a managed device profile (e.g., the managed device profile illustrated in FIG. 1 as a component of the profiles 116) for the managed device 102. As noted above, the server computer 112 (via execution of the device management service 110) can create and store the profiles 116. As noted above, the profile 116 can include the managed device profile and/or the private network profile, which can define what managed device 102 can connect to a private network 122 (e.g., a list of managed devices 102 that the private network 122 will allow to connect) and/or a list of private networks 122 that a managed device 102 can connect to (e.g., a list of private networks 122 that the managed device 102 can connect to). It should be understood that this example embodiment is illustrative, and therefore should not be construed as being limiting in any way.

From operation 208, the method 200 can proceed to operation 210. The method 200 can end at operation 210.

Figure 3:
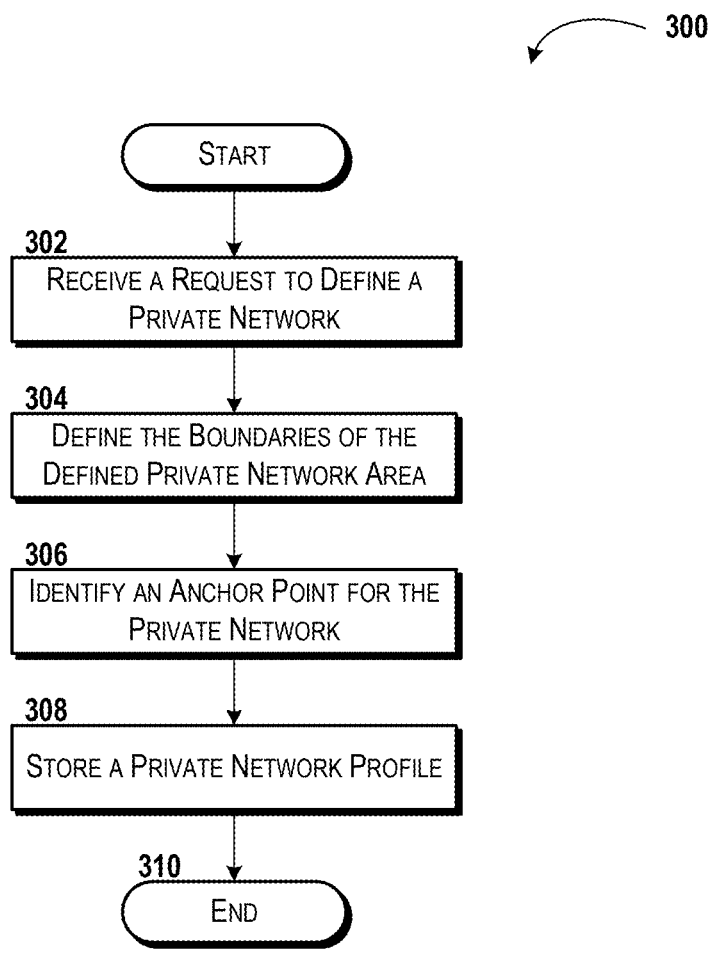
FIG. 3 is a flow diagram showing aspects of a method for creating and storing private network profiles using a device management service, according to an illustrative embodiment of the concepts and technologies described herein.

Turning now to FIG. 3, aspects of a method 300 for creating and storing private network profiles using a device management service 110 will be described in detail, according to an illustrative embodiment. For purposes of illustrating and describing the concepts of the present disclosure, the method 300 is described herein as being performed by the server computer 112 via execution of one or more software modules such as, for example, the device management service 110. It should be understood that additional and/or alternative devices and/or network nodes can provide the functionality described herein via execution of one or more modules, applications, and/or other software including, but not limited to, the device management service 110. Thus, the illustrated embodiments are illustrative, and should not be viewed as being limiting in any way.

The method 300 begins at operation 302. At operation 302, the server computer 112 can receive a request to define a private network 122. The request to define the private network 122 can correspond to a received request, a received service call, an interaction with the device management service 110 via a portal or application programming interface, or the like. The request to create and/or configure a private network 122 can be generated at any time, e.g., when a user or other entity determines that a private network 122 should be created, or the like. It should be understood that this example embodiment is illustrative, and therefore should not be construed as being limiting in any way.

From operation 302, the method 300 can proceed to operation 304. At operation 304, the server computer 112 can define the private network boundaries to create of a defined private network area 120 associated with the private network 122. According to various embodiments of the concepts and technologies disclosed herein, the functionality for providing a private network 122 and/or connecting devices (e.g., the managed devices 102) to the private network 122 can be provided to cause a managed device 102 that is located in and/or entering into a particular location to connect to a private network 122. Thus, operation 304 can correspond to defining a geographic area that, when entered into by the managed device 102, can cause the managed device 102 to connect to the private network 122 associated with the defined private network area 120. Thus, for example, if a private network 122 is associated with an office, the office building can be defined a defined private network area 120 that, when entered into by the managed device 102, causes the managed device 102 to connect to the private network 122 associated with the office building. It should be understood that this example embodiment is illustrative, and therefore should not be construed as being limiting in any way.

Thus, operation 304 can correspond to the server computer 112 defining the boundaries of one or more defined private network areas 120 including, for example, identifying three or more points (e.g., by coordinates, elevations, three-dimensional spaces on the earth or in the empty space above the earth, in various heights or elevations of buildings, in the sky, in the ground, combinations thereof, or the like) that bound the defined private network area 120; by identifying a street address associated with the private network 122, by identifying a ZIP code associated with the private network 122, and/or otherwise identifying one or more geographic locations associated with the private network 122 (and thereby identifying the defined private network area 120). In some other embodiments of the concepts and technologies disclosed herein, the defined private network area 120 can be defined as a distance from an anchor point or central point of the private network 122. Thus, the defined private network area 120 can be defined, for example, as a number of feet, meters, or the like around the anchor point of the private network 122, and as such, the geographic location of the defined private network area 120 can move over time (as the anchor point moves). It should be understood that this example embodiment is illustrative, and therefore should not be construed as being limiting in any way. As explained above, the defined private network area 120 can be used to determine, based on the presence of the managed device 102 within the defined private network area 120, that the managed device 102 should connect to the private network 122. It should be understood that this example embodiment is illustrative, and therefore should not be construed as being limiting in any way.

From operation 304, the method 300 can proceed to operation 306. At operation 306, the server computer 112 can identify an anchor point for the private network 122. According to various embodiments of the concepts and technologies disclosed herein, the anchor point can correspond to a device or entity associated with the private network 122 (e.g., a radio, transceiver, or the like) that can define a center or focus of the defined private network area 120 and/or the private network 122. It can be appreciated from the illustrated and described embodiments herein that the anchor point can be a stationary or mobile device or entity. Thus, for example, the anchor point can be defined as a particular device (e.g., a boat, car, ship, plane, or the like) that is mobile, or a stationary point such as a building, house, office, or the like. The anchor point can be selected and or identified based on input from a user or other entity and the anchor point can be defined as almost any entity.

From operation 306, the method 300 can proceed to operation 308. At operation 308, the server computer 112 can store a private network profile for the created private network 122. The private network profile can define, for a private network 122, the anchor point, the boundaries and/or other definition of the defined private network area 120 (e.g., a distance around and/or from the anchor point, coordinates, or other definitions of location either in absolute or relative terms), and a list of one or more managed devices 102 that are permitted and/or authorized to connect to the private network 122. The private network profile can be stored at the server computer 112 and/or in a remote data storage location. It should be understood that this example embodiment is illustrative, and therefore should not be construed as being limiting in any way.

From operation 308, the method 300 can proceed to operation 310. The method 300 can end at operation 310.

Figure 4:
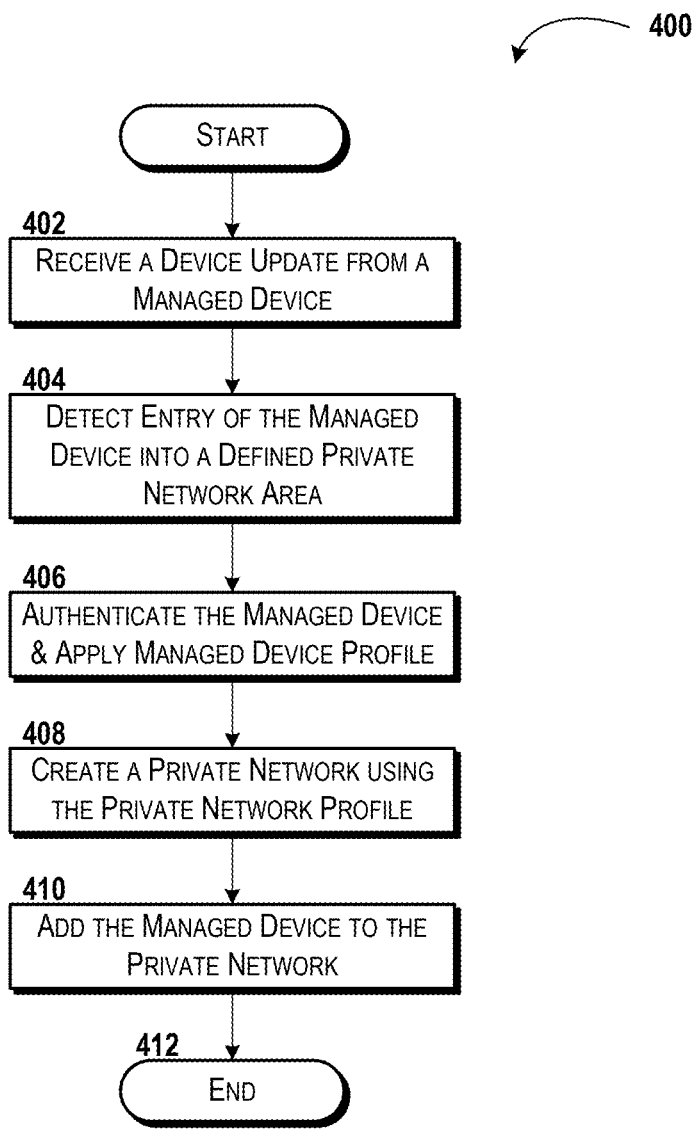
FIG. 4 is a flow diagram showing aspects of a method for adding a managed device to a private network, according to an illustrative embodiment of the concepts and technologies described herein.

Turning now to FIG. 4, aspects of a method 400 for adding a managed device 102 to a private network 122 will be described in detail, according to an illustrative embodiment. For purposes of illustrating and describing the concepts of the present disclosure, the method 400 is described herein as being performed by the server computer 112 via execution of one or more software modules such as, for example, the device management service 110. It should be understood that additional and/or alternative devices and/or network nodes can provide the functionality described herein via execution of one or more modules, applications, and/or other software including, but not limited to, the device management service 110. Thus, the illustrated embodiments are illustrative, and should not be viewed as being limiting in any way.

The method 400 begins at operation 402. At operation 402, the server computer 112 can receive a device update 114 from a managed device 102. As explained above, the device updates 114 can be generated and/or provided by the managed device 102 to the server computer 112 at various times such as, for example, according to a predetermined release schedule, according to regular and/or irregular intervals, when any underlying data changes (e.g., a change to the trajectory of the managed device 102, a change to network connections of the managed device 102, a change to a location of the managed device 102, combinations thereof, or the like). The device updates 114 also can be provided by the managed device 102 to the server computer 112 as part of a data stream (e.g., with a release of a device update 114 each and/or any time a location, trajectory, network connection or the like of the managed device 102 changes. Thus, it can be appreciated that the device updates 114 can be provided to the server computer 112 at almost any time. It should be understood that this example embodiment is illustrative, and therefore should not be construed as being limiting in any way.

From operation 402, the method 400 can proceed to operation 404. At operation 404, the server computer 112 can detect entry of the managed device 102 into a defined private network area 120. According to various embodiments of the concepts and technologies disclosed herein, the server computer 112 can be configured to analyze the one or more device updates 114 and determine, based on the analysis, a geographic location of the managed device 102. The server computer 112 also can determine, based on the profiles 116, if the location of the managed device 102 is within a defined private network area 120 associated with a private network 122.

In some embodiments, the server computer 112 can access the profiles 116 and determine geographic locations associated with the defined private network areas 120 (e.g., coordinates or other geographic location identifiers that define the defined private network areas 120 of private networks 122). In some other embodiments, the server computer 112 can access the profiles 116, determine locations of anchor points and defined private network areas 120 around those anchor points, and correlate the defined private network areas 120 to geographic locations (e.g., coordinates) to compare to the geographic location of the managed device 102. Regardless of how the location of the managed device 102 is compared to the location of the defined private network areas 120, the server computer 112 can determine, in operation 404, if the managed device 102 is entering and/or has entered into the defined private network area 120. Because this determination of operation 404 can be made in additional and/or alternative manners, it should be understood that the above examples are illustrative, and therefore should not be construed as being limiting in any way.

From operation 404, the method 400 can proceed to operation 406. At operation 406, the server computer 112 can authenticate the managed device 102. As noted above, the managed device 102 can be pre-authenticated by the server computer 112, so operation 406 can correspond with the managed device 102 passing its credentials (e.g., included in the bootstrap account 108) to the server computer 112 for authentication. In some embodiments, the managed device 102 can pass its credentials to a local controller 124 associated with the private network 122 instead of and/or in addition to the server computer 112. In any event, the managed device 102 can be fully authenticated by the device management service 110 (e.g., directly and/or via the local controller 124) in operation 406. It should be understood that this example embodiment is illustrative, and therefore should not be construed as being limiting in any way.

From operation 406, the method 400 can proceed to operation 408. At operation 408, the server computer 112 can create a private network 122 and/or trigger the creation of the private network 122 (e.g., via providing a command to the local controller 124 via the network data 126, by instructing other devices to create the private network, or the like). From operation 408, the method 400 can proceed to operation 410. At operation 410, the server computer 112 can add the managed device 102 to the private network 122. Operation 410 can correspond to the server computer 112 instructing the local controller 124 to add the managed device 102 to the private network 122, sending a command to the managed device 102 to connect to the private network 122, and/or triggering other devices to connect the managed device 102 to the private network 122. In any event, operation 410 can correspond to the managed device 102 connecting to the private network 122 and communicating therewith and/or thereby. It should be understood that this example embodiment is illustrative, and therefore should not be construed as being limiting in any way.

From operation 410, the method 400 can proceed to operation 412. The method 400 can end at operation 412.

Figure 5:
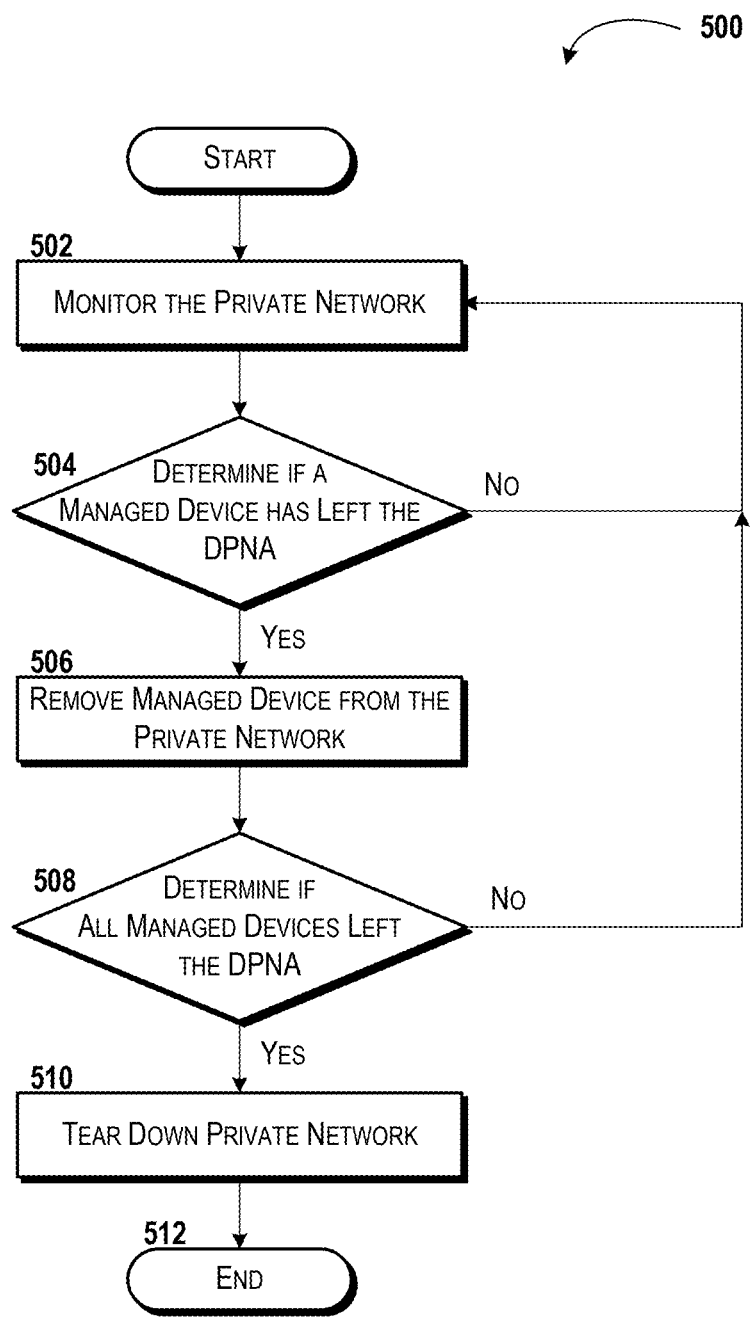
FIG. 5 is a flow diagram showing aspects of a method for monitoring a private network using a device management service, according to an illustrative embodiment of the concepts and technologies described herein.

Turning now to FIG. 5, aspects of a method 500 for monitoring a private network 122 using a device management service 110 will be described in detail, according to an illustrative embodiment. For purposes of illustrating and describing the concepts of the present disclosure, the method 500 is described herein as being performed by the server computer 112 via execution of one or more software modules such as, for example, the device management service 110. It should be understood that additional and/or alternative devices and/or network nodes can provide the functionality described herein via execution of one or more modules, applications, and/or other software including, but not limited to, the device management service 110. Thus, the illustrated embodiments are illustrative, and should not be viewed as being limiting in any way.

The method 500 begins at operation 502. At operation 502, the server computer 112 can monitor the private network 122. According to various embodiments of the concepts and technologies disclosed herein, the server computer 112 can receive, from the local controller 124 and/or other devices or entities associated with the private network 122, updates as part of the network data 126. According to various embodiments of the concepts and technologies disclosed herein, the updates included in the network data 126 can indicate what devices (e.g., the managed devices 102) are connected to the private network 122, what devices (e.g., the managed devices 102) have entered into the defined private network area 120 associated with the private network 122, what devices (e.g., the managed devices 102) have exited from and/or are about to exit from the defined private network area 120 associated with the private network 122, and the like. Thus, operation 502 can correspond to the server computer 112 receiving network data 126 from an entity or device such as the local controller 124 and/or creating the network data 126 via direct or indirect monitoring of the private network 122. It should be understood that this example embodiment is illustrative, and therefore should not be construed as being limiting in any way.

From operation 502, the method 500 can proceed to operation 504. At operation 504, the server computer 112 can determine if a managed device 102 has left the defined private network area 120. As noted above, the server computer 112 can analyze the updates of the network data 126 and/or the device updates 114. Based on these and/or other data, the server computer 112 can determine if the managed device 102 has left and/or is leaving the defined private network area 120. In some other embodiments, the server computer 112 can determine the geographic location of the managed device 102 and compare that geographic location to geographic locations associated with the defined private network area 120. In other embodiments, as noted above, the server computer 112 can receive an update indicating that the managed device 102 is leaving the defined private network area 120. Regardless of how the location of the managed device 102 is compared to the location of the defined private network areas 120, the server computer 112 can determine, in operation 504, if the managed device 102 is leaving and/or has left the defined private network area 120. It should be understood that this example embodiment is illustrative, and therefore should not be construed as being limiting in any way.

If the server computer 112 determines, in operation 504, that the managed device 102 has not left the defined private network area 120, the method 500 can return to operation 502, and the server computer 112 can continue monitoring the private network 122. It can be appreciated that operations 502-504 can be iterated until the server computer 112 determines, in any iteration of operation 504, that the managed device 102 has left the defined private network area 120.

If the server computer 112 determines, in operation 504, that the managed device has left the defined private network area 120, the method 500 can proceed to operation 506. At operation 506, the server computer 112 can remove the managed device 102 from the private network 122. It should be understood that in some embodiments of the concepts and technologies disclosed herein, a managed device 102 can be located outside the defined private network area 120 but still be in communications with the private network 122, the local controller 124, and/or other devices associated with the private network 122. As such, the server computer 112 can be configured to issue a command in operation 506 to remove the managed device 102 from the private network 122 if the managed device has left the defined private network area 120. Thus, the private network 122 may continue operating even if the managed device 102 is removed from the private network 122. It should be understood that this example embodiment is illustrative, and therefore should not be construed as being limiting in any way.

From operation 506, the method 500 can proceed to operation 508. At operation 508, the server computer 112 can determine if all managed devices 102 have left the defined private network area 120. Thus, the server computer 112 can determine if any other managed devices 102 are still connected to the private network 122 and/or if all managed devices 102 have left the defined private network area 120. If the server computer 112 determines, in operation 508, that all managed devices 102 have not left the defined private network area 120, the method 500 can again return to operation 502, and the server computer 112 can continue monitoring the private network 122. It therefore can be appreciated that operations 502-508 can be iterated until the server computer 112 determines, in any iteration of operation 508, that all managed devices 102 have left the defined private network area 120.

If the server computer 112 determines, in operation 508, that all managed devices have left the defined private network area 120, the method 500 can proceed to operation 510. At operation 510, the server computer 112 can tear down the private network 122. Thus, the server computer 112 can issue a command to the private network 122 (e.g., the local controller 124 and/or other entities at or associated with the private network 122). The command can cause the private network 122 to cease communications and to terminate the private network 122. It should be understood that this example embodiment is illustrative, and therefore should not be construed as being limiting in any way.

Because some embodiments of the concepts and technologies disclosed herein include creating an on-demand private network 122 for the managed device 102 when the managed device 102 enters the defined private network area 120, it should be understood that the private network 122 can be torn down (terminated) when the managed device 102 leaves the defined private network area 120. Thus, it should be understood that operation 508 can be omitted in various embodiments of the concepts and technologies disclosed herein, and the method 500 can flow directly from the yes branch of operation 506 to operation 510 in some embodiments. It should be understood that this example embodiment is illustrative, and therefore should not be construed as being limiting in any way.

From operation 510, the method 500 can proceed to operation 512. The method 500 can end at operation 512.

Figure 6:
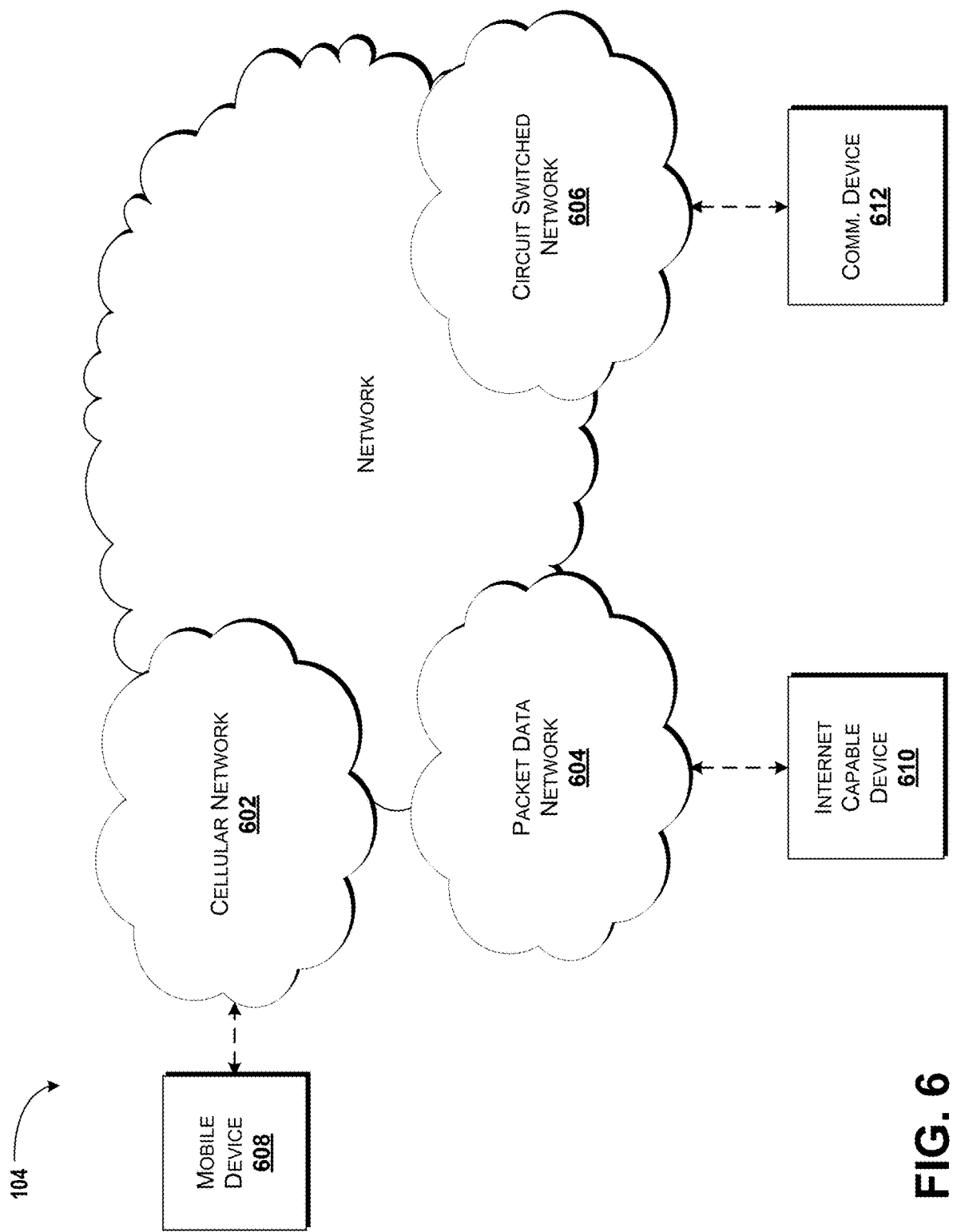
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs"); mobile management entities ("MMEs"); access and mobility management functions ("AMFs"); authentication server functions ("AUSFs"), network slice selection functions ("NSSFs"); network exposure functions ("NEFs"); policy control functions ("PCFs"); and various other functions in the user and control planes such as, for example, user plane functions ("UPFs"), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 602 also can include various interfaces between various components, as is generally understood. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, 6G mobile communication standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
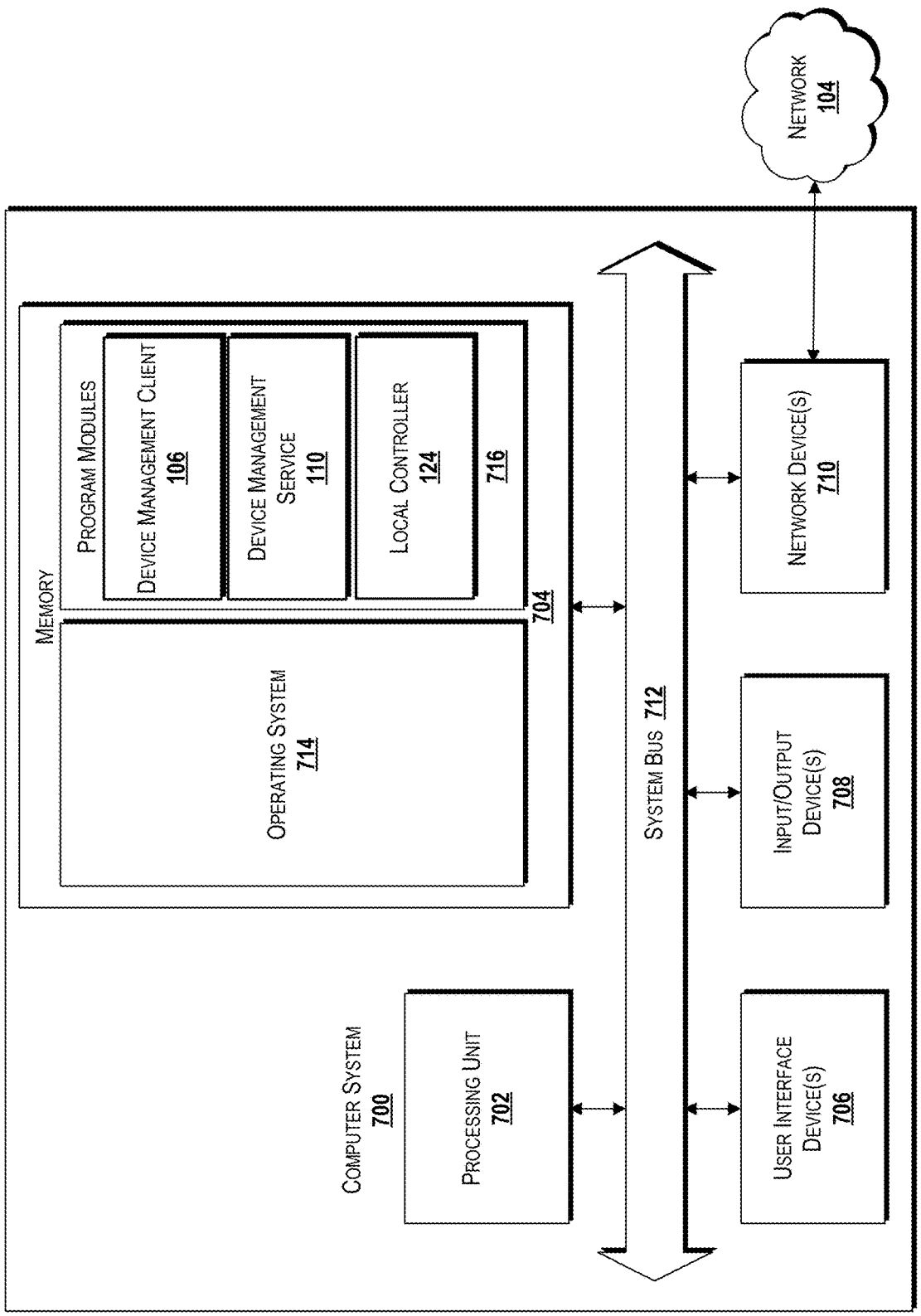
FIG. 7 is a block diagram illustrating an example computer system configured to provide on-demand private network creation and management, according to some illustrative embodiments of the concepts and technologies described herein.

FIG. 7 is a block diagram illustrating a computer system 700 configured to provide the functionality described herein for providing on-demand private network creation and management, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 can enable bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the device management client 106, the device management service 110, and the local controller 124. These and/or other programs can be embodied in computer-readable media containing instructions that, when executed by the processing unit 702, perform one or more of the methods 200, 300, 400, and 500 described in detail above with respect to FIGS. 2-5 and/or other functionality as illustrated and described herein. It can be appreciated that, at least by virtue of the instructions embodying the methods 200, 300, 400, 500, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the bootstrap account 108 (including the credentials), the device updates 114, the profiles 116, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
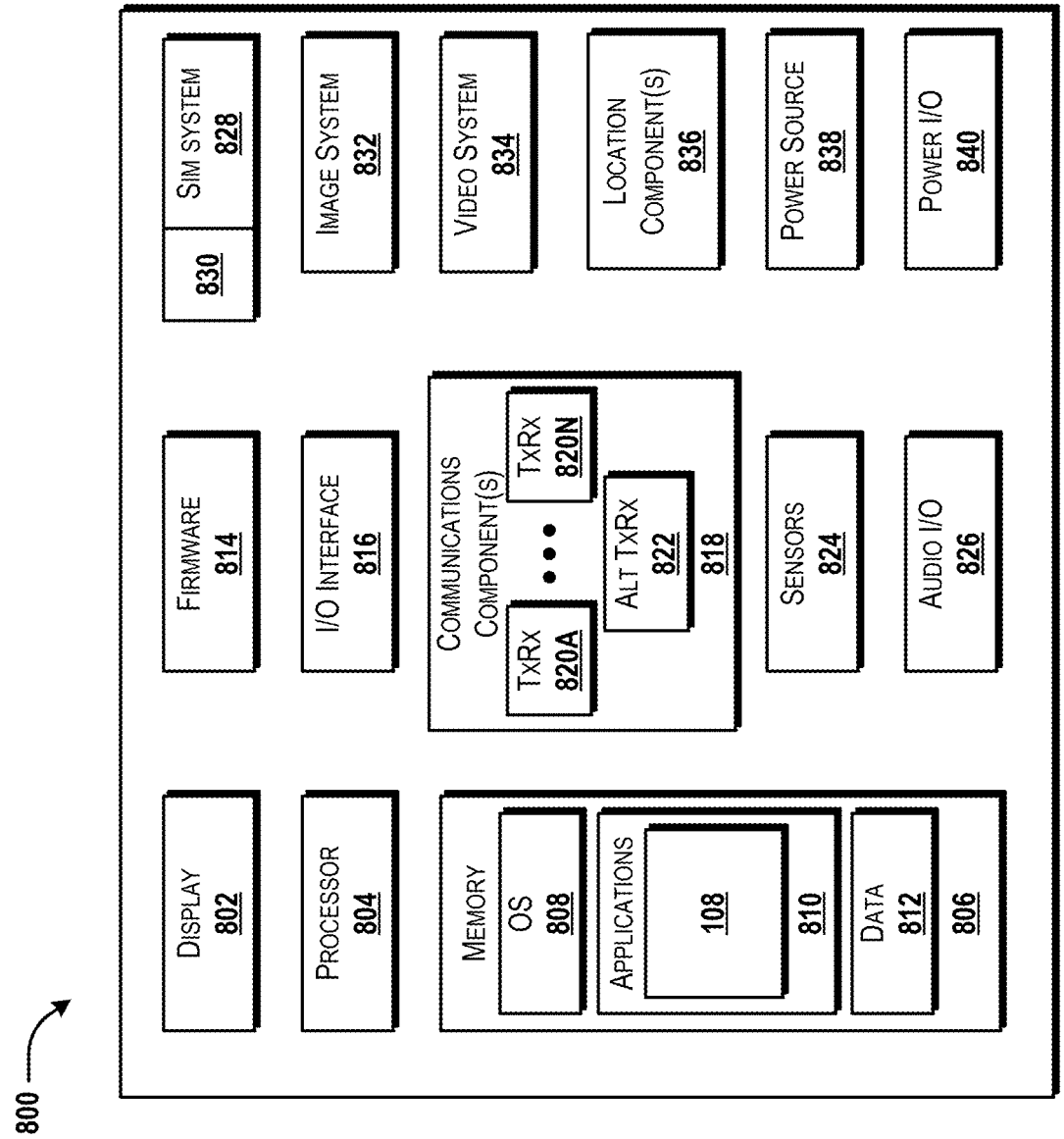
FIG. 8 is a block diagram illustrating an example mobile device configured to interact with a device management service, according to some illustrative embodiments of the concepts and technologies described herein.

Turning now to FIG. 8, an illustrative mobile device 800 and components thereof will be described. In some embodiments, the managed device 102 and/or the user device 118 described above with reference to FIGS. 1-5 can be configured as and/or can have an architecture similar or identical to the mobile device 800 described herein in FIG. 8. It should be understood, however, that the managed device 102 and/or the user device 118 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the device management client 106, other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, configuring settings, manipulating address book content and/or settings, multi-mode interaction, interacting with other applications 810, and otherwise facilitating user interaction with the operating system 808, the applications 810, and/or other types or instances of data 812 that can be stored at the mobile device 800. The data 812 can include, for example, the device management client 106 and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, 6G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/ WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/ or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
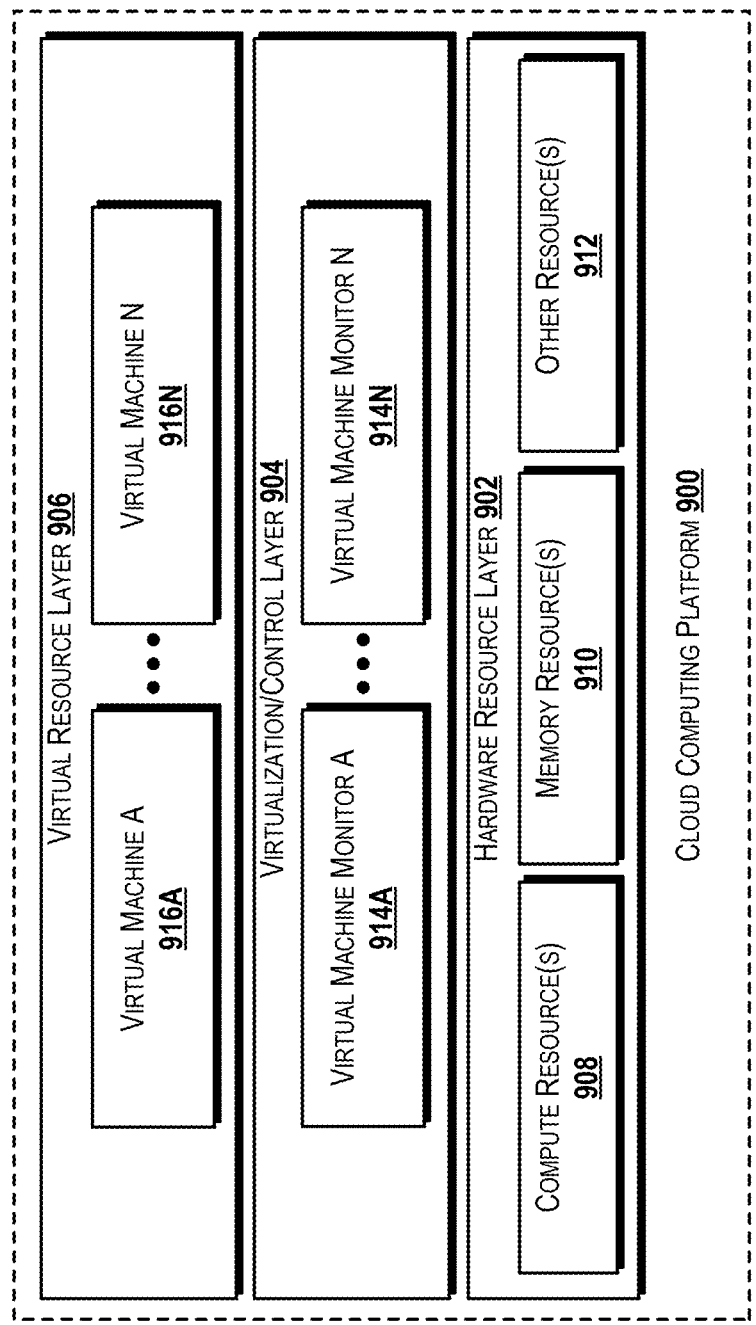
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for on-demand private network creation and management and/or for supporting interactions with the device management service 110. Thus, it can be appreciated that in some embodiments of the concepts and technologies disclosed herein, the cloud computing platform 900 illustrated in FIG. 9 can be used to provide the functionality described herein with respect to the server computer 112 and/or the local controller 124.

The cloud computing platform 900 thus may be utilized to execute any aspects of the software components presented herein. Thus, according to various embodiments of the concepts and technologies disclosed herein, the device management service 110 and/or the local controller 124 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the device management service 110 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the device management service 110 or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the device updates 114, the profiles 116, the network data 126, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for on-demand private network creation and management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
detecting, based on a geographic location of a managed device, that the managed device has entered into a defined private network area, wherein the defined private network area defines an area in which the managed device should be connected to a private network, and wherein the private network is defined by an anchor point and boundaries around the anchor point, the boundaries defining the defined private network area,
authenticating, using a bootstrap account stored by the managed device and a managed device profile associated with the managed device, the managed device, wherein the bootstrap account comprises credentials for the managed device, wherein the bootstrap account is stored in a non-volatile memory device of the managed device, and wherein the managed device profile defines networks with which the managed device can communicate,
creating, using a private network profile, the private network, wherein the private network profile includes data defining the anchor point and the boundaries around the anchor point, and adding the managed device to the private network, whereby the managed device communicates with the private network.

2. The system of claim 1, wherein the bootstrap account is stored in a secure memory, and wherein the credentials of the bootstrap account are used to pre-authorize the managed device for communications via the private network.

3. The system of claim 1, wherein the anchor point of the private network comprises a mobile entity, and wherein the boundaries around the anchor point are defined as distances from the anchor point.

4. The system of claim 3, wherein detecting that the managed device has entered into the defined private network area comprises determining the geographic location of the managed device, determining a current geographic location of the anchor point, determining current geographic locations of the boundaries, and determining that the managed device is in the defined private network area.

5. The system of claim 3, wherein the anchor point comprises a vehicle.

6. The system of claim 1, wherein the anchor point of the private network comprises a stationary location, and wherein the boundaries around the anchor point are defined by geographic locations.

7. The system of claim 1, wherein the computer-executable instructions, when executed by the processor, cause the processor to perform operations further comprising:
monitoring the private network by receiving, from a local controller that controls the private network, network updates comprising data that indicates a current location of the managed device; and
in response to determining that the managed device has left the defined private network area, tearing down the private network.

8. A method comprising:
detecting, by a computer comprising a processor and based on a geographic location of a managed device, that the managed device has entered into a defined private network area, wherein the defined private network area defines an area in which the managed device should be connected to a private network, and wherein the private network is defined by an anchor point and boundaries around the anchor point, the boundaries defining the defined private network area;
authenticating, by the processor and using a bootstrap account stored by the managed device and a managed device profile associated with the managed device, the managed device, wherein the bootstrap account comprises credentials for the managed device, wherein the bootstrap account is stored in a non-volatile memory device of the managed device, and wherein the managed device profile defines networks with which the managed device can communicate;
creating, by the processor and using a private network profile, the private network, wherein the private network profile includes data defining the anchor point and the boundaries around the anchor point; and
adding, by the processor, the managed device to the private network, whereby the managed device communicates with the private network.

9. The method of claim 8, wherein the bootstrap account is stored in a secure memory, and wherein the credentials of the bootstrap account are used to pre-authorize the managed device for communications via the private network.

10. The method of claim 8, wherein the anchor point of the private network comprises a mobile entity, and wherein the boundaries around the anchor point are defined as distances from the anchor point.

11. The method of claim 10, wherein detecting that the managed device has entered into the defined private network area comprises determining the geographic location of the managed device, determining a current geographic location of the anchor point, determining current geographic locations of the boundaries, and determining that the managed device is in the defined private network area.

12. The method of claim 8, wherein the anchor point of the private network comprises a stationary location, and wherein the boundaries around the anchor point are defined by geographic locations.

13. The method of claim 8, further comprising:
monitoring the private network by receiving, from a local controller that controls the private network, network updates comprising data that indicates a current location of the managed device; and
in response to determining that the managed device has left the defined private network area, tearing down the private network.

14. A computer storage medium having computer-executable instructions stored thereon that, when executed by a processor, cause the processor to perform operations comprising:
detecting, based on a geographic location of a managed device, that the managed device has entered into a defined private network area, wherein the defined private network area defines an area in which the managed device should be connected to a private network, and wherein the private network is defined by an anchor point and boundaries around the anchor point, the boundaries defining the defined private network area;
authenticating, using a bootstrap account stored by the managed device and a managed device profile associated with the managed device, the managed device, wherein the bootstrap account comprises credentials for the managed device, wherein the bootstrap account is stored in a non-volatile memory device of the managed device, and wherein the managed device profile defines networks with which the managed device can communicate;
creating, using a private network profile, the private network, wherein the private network profile includes data defining the anchor point and the boundaries around the anchor point; and
adding the managed device to the private network, whereby the managed device communicates with the private network.

15. The computer storage medium of claim 14, wherein the bootstrap account is stored in a secure memory, and wherein the credentials of the bootstrap account are used to pre-authorize the managed device for communications via the private network.

16. The computer storage medium of claim 14, wherein the anchor point of the private network comprises a mobile entity, and wherein the boundaries around the anchor point are defined as distances from the anchor point.

17. The computer storage medium of claim 16, wherein detecting that the managed device has entered into the defined private network area comprises determining the geographic location of the managed device, determining a current geographic location of the anchor point, determining current geographic locations of the boundaries, and determining that the managed device is in the defined private network area.

18. The computer storage medium of claim 16, wherein the anchor point comprises a vehicle.

19. The computer storage medium of claim 14, wherein the anchor point of the private network comprises a stationary location, and wherein the boundaries around the anchor point are defined by geographic locations.

20. The computer storage medium of claim 14, wherein the computer-executable instructions, when executed by the processor, cause the processor to perform operations further comprising:
- monitoring the private network by receiving, from a local controller that controls the private network, network updates comprising data that indicates a current location of the managed device; and
- in response to determining that the managed device has left the defined private network area, tearing down the private network.

* * * * *